Figure 1:
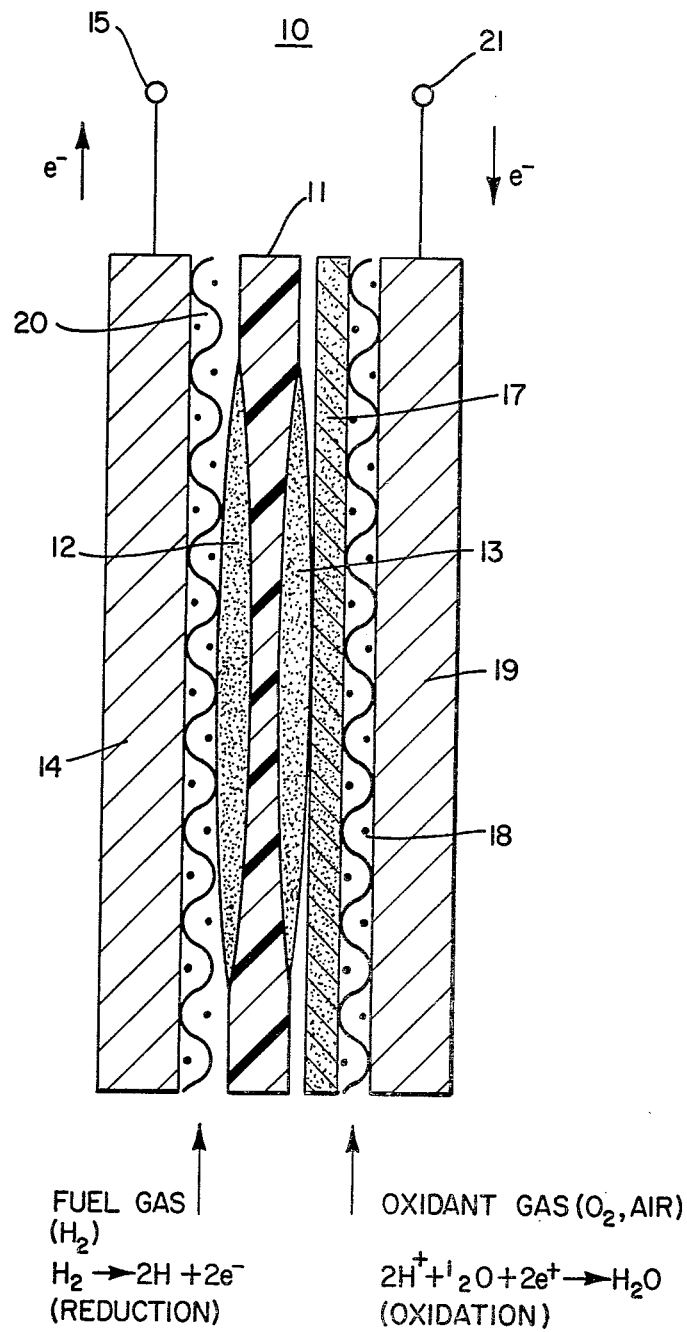

United States Patent [19]

MacLeod

[11] 4,215,183

[45] Jul. 29, 1980

[54] WET PROOFED CONDUCTIVE CURRENT COLLECTOR FOR THE ELECTROCHEMICAL CELLS

[75] Inventor: Edward N. MacLeod, Boston, Mass.

[73] Assignee: General Electric Company, Wilmington, Mass.

[21] Appl. No.: 490

[22] Filed: Jan. 2, 1979

[51] Int. Cl.$^2$ ............................................. H01M 8/10
[52] U.S. Cl. ...................................... 429/30; 429/41; 429/42
[58] Field of Search .................. 429/41, 42, 30, 32, 429/33

[56] References Cited

U.S. PATENT DOCUMENTS

| | | | |
|---|---|---|---|
| 3,134,697 | 5/1964 | Niedrach | 429/30 |
| 3,297,484 | 1/1967 | Niedrach | 429/41 |
| 4,017,663 | 4/1977 | Breault | 429/42 |

Primary Examiner—Donald L. Walton
Attorney, Agent, or Firm—I. David Blumenfeld

[57] ABSTRACT

An electrochemical cell such as a fuel cell comprising an ion exchange membrane electrolyte and catalytic electrodes bonded to the surface of the membrane is provided with a wet proofed carbon paper current collector at the oxidizing electrode. The use of a wet proofed carbon paper current collector allows axial current collection from the bonded electrodes thereby avoiding the need for conductive screens directly in the bonded electrodes. The wet proofed carbon paper by virtue of its hydrophobic character prevents flooding of the electrode by the cell product water.

7 Claims, 1 Drawing Figure

FUEL GAS ($H_2$)
$H_2 \rightarrow 2H + 2e^-$
(REDUCTION)

OXIDANT GAS ($O_2$, AIR)
$2H^+ + \frac{1}{2}O + 2e^+ \rightarrow H_2O$
(OXIDATION)

WET PROOFED CONDUCTIVE CURRENT COLLECTOR FOR THE ELECTROCHEMICAL CELLS

The instant invention relates to a wet proofed current collector and more particularly to an electrochemical cell utilizing a wet proofed current collector which contacts cell electrodes bonded to the surface of an ion exchanging membrane.

Hitherto electrochemical cells of the type utilizing an ion exchange membrane as the electrolyte with catalytic electrodes bonded to the membrane required embedding current conducting metal screens in the electrode as the mechanism for conducting current to and from the electrodes. This arrangement involves supporting a bonded aggregate of catalytically active, and hydrophobic resin particles in a screen, of tantalum, niobium, or titanium, etc. with the entire assembly being bonded to the face of the ion exchanging membrane. The screens not only supported the bonded particles but also carried current from and to the electrodes. This form of current collection by means of metallic screens embedded into the electrode is known as edge current collection and required screens of materials such as tantalum, niobium, etc. which are very expensive. Furthermore, the fabrication of electrodes having a current collecting screen embedded therein can present formidable manufacturing difficulties.

In addition, particularly in fuel cells in which electricity is produced by the reduction and oxidation of hydrogen to form water, the production of water at the electrode at which the hydrogen ions are oxidized can result in the formation of a film of water over the electrodes thus, "flooding" the electrode and seriously affecting the performance of the cell.

Applicant has found that virtually all of these problems can be obviated by utilizing a wet proofed, conductive carbon paper which may be positioned directly against the surface of the bonded electrode to allow axial current conduction into and out of the electrode thereby eliminating edge current collection and the manufacturing problems associated with embedding a current conducting screen in a bonded mass of catalytic and hydrophobic particles.

Furthermore, the carbon paper has excellent conductivity even though partially impregnated by non conductive hydrophobic particles. The hydrophobicity of the wet proofed carbon paper is excellent in that it readily sheds water to prevent the formation of a water film over the electrode.

It is therefore, a principal objective of this invention to provide an electrochemical cell utilizing a wet proofed carbon paper as a current conductor in contact with a unitary bonded electrode/ion transporting membrane structure.

A further objective of the instant invention is to provide a fuel cell with an ion exchanging membrane and electrodes bonded thereto in which axial current collection is made possible through the use of a wet proofed, conductive carbon paper contacting a bonded electrode.

Other objective and advantages of the invention will become apparent as the description thereof proceeds.

In accordance with one aspect of the invention an electrochemical cell such as a fuel cell includes an ion exchanging membrane electrolyte. Bonded aggregates of catalytic and hydrophobic binder particles are bonded to opposite sides of the membrane to form the fuel and oxidant electrodes. A fuel gas such as hydrogen is brought in contact with the electrode on one side where it is reduced releasing electrons and producing hydrogen ions which are transported through the membrane. An oxidant such as oxygen or air is brought into contact with the oxidant electrode and the hydrogen ions are oxidized to produce water. The oxidant electrode at which product water is formed is in intimate contact with a wet proofed current conducting carbon paper thereby eliminating the need for embedding a conductive screen in the electrode.

The novel features which are believed to be characteristic of this invention are set forth with particularity in the appended claims. The invention itself, however, both as to its construction and method of operation together with further objectives and advantages thereof can best be understood by reference to the following description of taken in connection with the accompanying drawing in which:

The sole FIGURE is a partial sectional view of electrochemical cell utilizing an ion exchange membrane and having a conductive wet proofed carbon current collector adjacent to one of the bonded electrodes of the cell.

The conductive wet proofed, carbon paper current collector of the novel cell arrangement is positioned adjacent to and in contact with the bonded catalytic air or oxygen electrode to permit axial current conduction to and from the bonded electrode while at the same time preventing product water from forming a film over the electrode or over the current conductor.

The wet proofed collector is fabricated by treating a conductive carbon or graphite paper with an aqueous solution of a hydrophobic polymer to impregnate the surface of the carbon paper and may be prepared in the following manner:

Carbon paper may, for example, be produced by carbonizing fibers such as nylon or rayon by heating them at high temperatures in the range 1300°–1500° F. and forming them into a thin 15 mil paper by any well known paper process. Carbon paper is commercially available from a number of sources. One acceptable carbon paper is that sold by the Stackpole Corp. of St. Marys, Pa. under its trade designation PC-206. The graphite or carbon paper is then processed by impregnating the conductive carbon paper with a hydrophobic polymer. One form of hydrophobic polymer which is useful in such conductive wet proofed paper is a fluorocarbon polymer such as polytetrafluoroethylene, for example, which is sold commercially by the Dupont Company under its trade designation, TFE-30. While polytetrafluoroethylene is preferred other perfluorinated fluorocarbon materials may be used with equal facility.

The conductive carbon coated paper is impregnated by immersing it in a dispersion of the polymer in water with the polymer containing a surfactant such as a long chain hydrocarbon organic surface active agents such as the one sold by ROHM-HAAS under its trade designation TRITON-X. Typically a composition of TFE-30 is 8 grams of the polytetrafluoroethylene per cc of water and contains less than 5% by weight of the TRITON-X.

The dispersion may be anywhere from a 5:1 to a 45:1 water solution with solutions in the range of 7:1–10:1 being preferred. The range of the solution used is determined by a balance between the resistivity of the paper and its hydrophobic characteristic. It has been found that solutions the range of 7:1-10:1 provide good conductivity and excellent wet proofing. The polymer content of the wet-proofed conductor should be in the range of 20-35 miligrams of the polymer/cm$^2$ of PC206 carbon paper with 28 miligrams/cm$^2$ being preferred. The polytetrafluoroethylene impregnated paper is then sintered at about 590° F.–650° F. for 15 minutes with a sintering temperature of 630° F. being preferred. The minimum temperature for Teflon flow is 590° F. but it has been found that a sintering temperature of 630° F. is extremely satisfactory.

A wet proofed carbon paper made in accordance with the above described procedure has excellent wet proofing characteristics, has good porosity, with a void volume of approximately 50%, to allow ready access of the oxidant gas to the electrode. The external wet proofing of the carbon paper is excellent in that water beads readily at the surface and will not form a film. Furthermore the bulk resistivity of the carbon paper is found to be in the order of $8.3 \times 10^{-3}$ Ω centimeters at 220 psi compressive loading which compares very favorably with a resistivity of $4.8 \times 10^{-3}$ Ω centimeters for pure PC 206 carbon paper.

The sole FIGURE of the drawing shows a partial sectional view of a fuel cell utilizing a conductive wet proofed carbon paper between the oxidant electrode and the other current collecting elements of the cell. Fuel cell 10, in which the housing, gaskets, valves, inlet and outlet conduits, etc. are not shown, includes an ion permeable membrane 11 as the sole electrolyte and catalytic electrodes 12 and 13 bonded to opposite faces of the ion exchange membrane. A fuel gas such as hydrogen is supplied to electrode 12 through current conducting and fluid distribution screen 20. Screen 20 is positioned between electrode 12 and a current collecting plate 14 which is connected to cell outlet terminal 15. The hydrogen fuel gas is reduced at the catalytic electrode with the release of electrons and hydrogen ions (H+). The electrons flow through current collecting screen 20 and plate 14 to output terminal 15. The hydrogen ions are transported through cation exchanging membrane 11 to electrode 13 bonded to the opposite face of cation exchange membrane 11. Electrode 13 is in contact with a porous, conductive, wet proofed current conducting carbon paper sheet 17 which is positioned between the electrode and current conducting and fluid distribution screen 18 which contacts current collecting plate 19. An oxidant gas such as oxygen or air is supplied to electrode 13 through screen 18 and through the porous current conducting wet proofed carbon paper 17. The hydrogen ions transported across the membrane, the oxidant and electrons from terminal 21 combine in an oxidation reaction to form product water. Screens 20 and 18 may be fabricated of tantalum, titanium, or niobium. By virtue of the conductive characteristics of carbon paper 17 there is axial current conduction between current collector plate 19 conducting screen 18 and electrode 13 thus avoiding a need for embedding a conductive screen in the bonded mass of catalytic and hydrophobic binder particles. Because of its hydrophobic characteristics product water produced at the electrode/carbon paper interface beads and is prevented from forming a film which interrupt the conductive path between the electrode and conductive carbon paper 17.

The electrodes are aggregate masses of catalytic noble metal particles, preferably platinum, although other metals may be utilized, bonded together (as by sintering) with hydrophobic particles such as the polytetrafluoroethylene particles sold by Dupont under its trade designation Teflon.

The preparation of the electrodes involves first mixing 15-30 weight % of Teflon (T-30) with the catalytic particles. The mixture of the noble metal and Teflon particles, is placed in a mold and heated until the composition is sintered into a decal form which is bonded to and embedded to the surface of the membrane by the application of pressure and heat. Various methods may be utilized to bond and embed the electrode into the membrane including the one described in detail in U.S. Pat. No. 3,134,697 entitled "Fuel Cell" issued May 26, 1964, in the name of Leonard W. Niedrach assigned to the General Electric, the assignee of the present invention. In the process described therein, the electrode structure is forced into the surface of a partially polymerized ion exchange membrane, thereby integrally bonding the sinter, porous electrode to the membrane.

Ion exchange membrane 11 may be one of a variety of cation exchanging membranes, polymeric or otherwise. One which functions very adequately is a perfluorocarbon sulfonic acid polymer electrolyte sold by Dupont under its trade designation "Nafion". The membrane is a cationic membrane in that it is permselective and will transport only positively charged cations and blocks negatively charged anions.

EXAMPLES

To illustrate the operational characteristics of a fuel cell with a wet proofed, conductive carbon paper a cell was constructed which included a Nafion perfluorocarbon sulfonic acid polymer electrolyte membrane. Electrodes in the form of aggregates of platinum particles, with a loading of 4 miligrams of Pt./cm$^2$ with a 15 weight % of T-30 polytetrafluoroethylene were bonded to opposite faces of the membrane. The wet proof conductive layer was a 15 mil thick Stackpole PC-206 carbon paper saturated with a 10:1 solution of TFE with the TFE concentration being 28 miligrams of TFE/cm$^2$ of PC 206. The saturated carbon paper was then sintered for 15 minutes at 630° F. The cell was operated at various current densities, at 120° F. with hydrogen as the fuel gas at 5 psig and oxygen and air as oxidant gases at 10 psig with the following results:

| Oxidant | Current Density (ASF) | Cell Voltage (volts) |
| --- | --- | --- |
| O$_2$ | 50 | 0.88 |
|  | 100 | 0.83 |
|  | 150 | 0.78 |
|  | 200 | 0.74 |
| Air | 50 | 0.79 |
|  | 100 | 0.72 |
|  | 150 | 0.68 |
|  | 200 | 0.63 |

It can be seen from the above data that excellent performance was achieved, over the wide range of current density, in a fuel cell incorporating a wet proofed current conductor at the electrode at which the water forming oxidation reaction takes place.

The resistivity of the wet proofed conductive carbon paper was measured under 220 psi compressive loading vis-a-vis a non-wet proofed pure carbon paper. The resistivity of the untreated carbon paper was $4.8 \times 10^{-3}$ Ω centimeters while wet proofed carbon paper treated as described above had a resistivity of $8.3 \times 10^{-3}$ Ω centimeters.

This data indicates that although the resistivity of the wet proofed carbon paper is greater than that of the untreated carbon paper the resistivity compares quite favorably with the resistivity of pure carbon paper.

It will be apparent from the foregoing, that a novel fuel cell arrangement has been provided with catalytic electrodes bonded to the surface of an ion exchange membrane in which axial current conduction is provided by a wet proofed, conductive, carbon paper sheet positioned directly against the electrode thereby eliminating the need for conductive screens in the electrodes themselves and the need for edge current collection.

While a specific embodiment of this invention has been shown and described above, it will, of course, be understood that the invention is not limited thereto since many modifications, both in the circuit and the instrumentality implored therein may be made. It is contemplated by the appended claims to cover any such modifications which fall within the true spirit and scope of this invention.

What is claimed as new and desired to be secured by Letters of Patent of the United States is:

1. In an electrochemical cell in which one of the electrodes is exposed to water, the combination comprising
   (a) a housing
   (b) a fluid impervious ion transporting membrane separating said housing into anode and cathode chamber
   (c) a catalytic anode electrode bonded to the side of said membrane facing the anode chamber and adapted to be exposed to a fuel gas
   (d) a catalytic cathode electrode bonded to the other side of said membrane facing the cathode chamber adapted to be exposed to an oxidant gas and to water
   (e) an electrically conductive, porous, carbon paper sheet in contact with the cathode electrode bonded to said membrane over a substantial portion thereof said carbon paper including a hydrophobic polymer dispersed therein for wet proofing said carbon paper sheet to prevent formation of a water film adjacent to said bonded electrode and interruption of the conductive path between said bonded electrode and said conductive carbon paper sheet.
   (f) a conductive screen in contact with the wet proofed carbon paper on the side remote from the cathode electrode bonded to the membrane,
   (g) conductive plate means in contact with said screen and an output terminal to permit axial current flow from the surface of the bonded cathode electrode to said terminal.

2. The electrochemical cell according to claim 1 wherein said hydrophobic polymer dispersed in said conductive carbon paper is a hydrophobic fluorocarbon.

3. The electrochemical cell according to claim 2 wherein said hydrophobic fluorocarbon is polytetrafluoroethylene.

4. The electrochemical cell according to claim 2 including means to supply a fuel gas to said anode and an oxidant gas to said carbon paper on the side away from said bonded cathode electrode whereby electricity is generated between said electrodes and water is produced at the cathode electrode.

5. The electrochemical fuel cell according to claim 4 wherein said porous carbon paper has a void volume of 50%.

6. The electrochemical fuel cell according to the claim 4 wherein said wet proofed carbon paper contains from 20–35 grams of the hydrophobic polymer per $cm^2$ of said carbon paper.

7. The electrochemical fuel cell according to claim 6 wherein said wet proofed carbon paper contains 28 grams of the hydrophobic polymer per $cm^2$ of said carbon paper.

* * * * *